(12) United States Patent
Mita et al.

(10) Patent No.: US 10,566,775 B2
(45) Date of Patent: Feb. 18, 2020

(54) CONNECTION STRUCTURE OF ELECTRICAL JUNCTION BOX AND PROTECTION MEMBER

(71) Applicant: Yazaki Corporation, Minato-ku, Tokyo (JP)

(72) Inventors: Akihiro Mita, Hiroshima (JP); Tooru Sasaki, Hiroshima (JP); Masayoshi Kamenoue, Hiroshima (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 16/254,750

(22) Filed: Jan. 23, 2019

(65) Prior Publication Data

US 2019/0229509 A1    Jul. 25, 2019

(30) Foreign Application Priority Data

Jan. 23, 2018 (JP) .................. 2018-009027

(51) Int. Cl.
| | |
|---|---|
| H02G 3/08 | (2006.01) |
| H01B 7/00 | (2006.01) |
| B60R 16/02 | (2006.01) |
| H02G 3/06 | (2006.01) |
| H02G 3/04 | (2006.01) |

(52) U.S. Cl.
CPC ......... *H02G 3/081* (2013.01); *B60R 16/0215* (2013.01); *H01B 7/0045* (2013.01); *H02G 3/0616* (2013.01); *H02G 3/0418* (2013.01); *H02G 3/0437* (2013.01); *H02G 3/088* (2013.01)

(58) Field of Classification Search
CPC ... H02G 3/081; B60R 16/0215; H01B 7/0045
USPC ......................................................... 174/535
See application file for complete search history.

(56) References Cited

U.S. PATENT DOCUMENTS

| | | | |
|---|---|---|---|
| 6,633,089 B2 | 10/2003 | Kimura | |
| 2002/0130553 A1* | 9/2002 | Kimura | B60R 16/0215 307/10.1 |
| 2012/0085565 A1* | 4/2012 | Kleiss | H02G 3/08 174/50 |
| 2014/0338949 A1* | 11/2014 | Kakimi | H02G 3/088 174/50 |

FOREIGN PATENT DOCUMENTS

JP    2002-264737 A    9/2002

* cited by examiner

*Primary Examiner* — Timothy J Thompson
*Assistant Examiner* — Charles Pizzuto
(74) *Attorney, Agent, or Firm* — Banner & Witcoff, Ltd.

(57) ABSTRACT

A connection structure of an electrical junction box and a protection member includes an electrical junction box configured to be attached to a vehicle body, a wire harness in which one end is connected into the electrical junction box and other end is led out from the electrical junction box, a protection member in which the other end of the wire harness led out from the electrical junction box is covered and inserted and which includes an attaching portion configured to be fixed to the vehicle body, and a connection band.

5 Claims, 6 Drawing Sheets

CONNECTION STRUCTURE OF ELECTRICAL JUNCTION BOX AND PROTECTION MEMBER

CROSS REFERENCE TO RELATED APPLICATIONS

This application claims priority from Japanese Patent Application No. 2018-009027 filed on Jan. 23, 2018, the entire contents of which are incorporated herein by reference.

BACKGROUND OF THE INVENTION

Field of the Invention

The present invention relates to a connection structure of an electrical junction box and a protection member.

Description of Related Art

In the engine room of a vehicle, an engine, a battery, electrical components, and the like are mounted, so it tends to be densified in recent years. A harness main wire (wire harness) drawn out from a relay box which is an electrical component is wired in an engine room (see, for example, the patent document 1: JP-A-2002-264737). A part of the harness main line is covered (protected) by a protector (protection member) made of resin and fixed to the vehicle in a form positioned on the strut housing.

[Patent Document 1] JP-A-2002-264737

According to a related art, in a wiring work of a harness in an engine room, after fixing a relay box in the engine room, a protector is fixed into the engine room while wiring a harness main line. Therefore, in a case where the harness main line and the protector are relatively movable because the harness main line is not fixed to the protector, it is necessary to fix the protector into the engine room after reworking while returning the protector to the proper position. For this reason, a wiring work of the harness into the engine room becomes complicated. In the relay box in the related art, countermeasures against water infiltration at the outlet portion of the harness main line are insufficient.

SUMMARY

One or more embodiments provide a connection structure of an electrical junction box and a protection member, capable of improving water stopping performance and facilitating wiring work of a harness into an engine room.

In an aspect (1), a connection structure of an electrical junction box and a protection member includes an electrical junction box configured to be attached to a vehicle body, a wire harness in which one end is connected into the electrical junction box and other end is led out from the electrical junction box, a protection member in which the other end of the wire harness led out from the electrical junction box is covered and inserted and which includes an attaching portion configured to be fixed to the vehicle body, and a connection band. The connection band connects the protection member to the electrical junction box, and holds the protection member and the electrical junction box with a predetermined distance therebetween such that an extra length portion of the wire harness which is exposed between the protection member and the electrical junction box is bent downward in a vertical direction to form a draining portion.

According to the aspect (1), the other end of the wire harness led out from the outlet portion of the electrical junction box is covered and protected by being inserted into the protection member. An extra length portion of the wire harness exposed from the protection member is provided between the protection member and the electrical junction box. The other end of the wire harness led out from the electrical junction box fixed to the vehicle body in the engine room is fixed to the vehicle body after the protection member is connected to the electrical junction box by the connection band.

In the wire harness, the extra length portion exposed between the protection member and the electrical junction box is shortened to a predetermined linear distance, by fixing the protection member to the electrical junction box by the connection band. As a result, the extra length portion is formed as a draining portion bent at a predetermined curvature (U shape) downward in the vertical direction. The draining portion suppresses the infiltration of water into the outlet portion of the electrical junction box by making water adhering to the wire harness flow down to the lowermost end of the bent portion.

In the connection structure of an electrical junction box and a protection member of the present configuration, the protection member can be fixed in the engine room, without performing a complicated positioning operation of moving the protection member to the proper position after fixing the electrical junction box into the engine room. Therefore, it is easy to wire the wire harness into the engine room.

In an aspect (2), at least one of the electrical junction box and the protection member includes a locking hole. The connection band includes a locking portion which is locked in the locking hole. The locking portion includes a water stopping plate portion which abuts against a peripheral edge of the locking hole to close an opening of the locking hole, when the locking portion is locked in the locking hole.

According to the aspect (2), the locking portion of the connection band is locked in the locking hole of the electrical junction box, so that the protection member is connected to the electrical junction box through the connection band. The locking portion has a water stopping plate portion and is locked in the locking hole, and the water stopping plate portion abuts against the peripheral edge of the locking hole to close the opening from the outside of the electrical junction box. Thus, it is possible to take countermeasures against water infiltration into the locking hole bored in the electrical junction box in order to fix the connection band.

In an aspect (3), each of the electrical junction box and the protection member includes a locking hole. The connection band includes a plurality of locking portions at both ends of the connection band, each of which is locked in the locking hole. The connection band is formed separately from the electrical junction box and the protection member.

According to the aspect (3), the connection band is formed as a single body separate from the protection member and the electrical junction box. The connection band is formed into, for example, an elongated band shape such that the protection member and the electrical junction box can be separated from each other by a predetermined distance while avoiding interference with other members. A locking portion is formed at both longitudinal ends of the connection band. On the other hand, each of the protection member and the electrical junction box is provided with a locking hole to which the locking portion is locked. The locking portion of the connection band is locked in the locking holes of both the protection member and the electrical junction box, so the protection member is separated from the electrical junction box by a predetermined distance through the connection band. The separation distance between the protection member and the electrical junction box is determined by the connection band. Therefore, in the connection structure of an electrical junction box and a protection member having the present configuration, a plurality of connection bands having different lengths are formed, and a predetermined connection band is selectively used according to the separation distance between the protection member and the electrical junction box, which differs according to the specification of the vehicle, so it is possible to easily deal with various specifications.

According to one or more embodiments, it is possible to improve the water stopping performance and to facilitate the wiring work of the harness into the engine room.

The present invention has been briefly described above. Further, the details of the present invention will be further clarified by reading modes for carrying out the invention described below with reference to the accompanying drawings.

DETAILED DESCRIPTION

Hereinafter, embodiments of the present invention will be described with reference to the drawings.

First Embodiment

Figure 1:
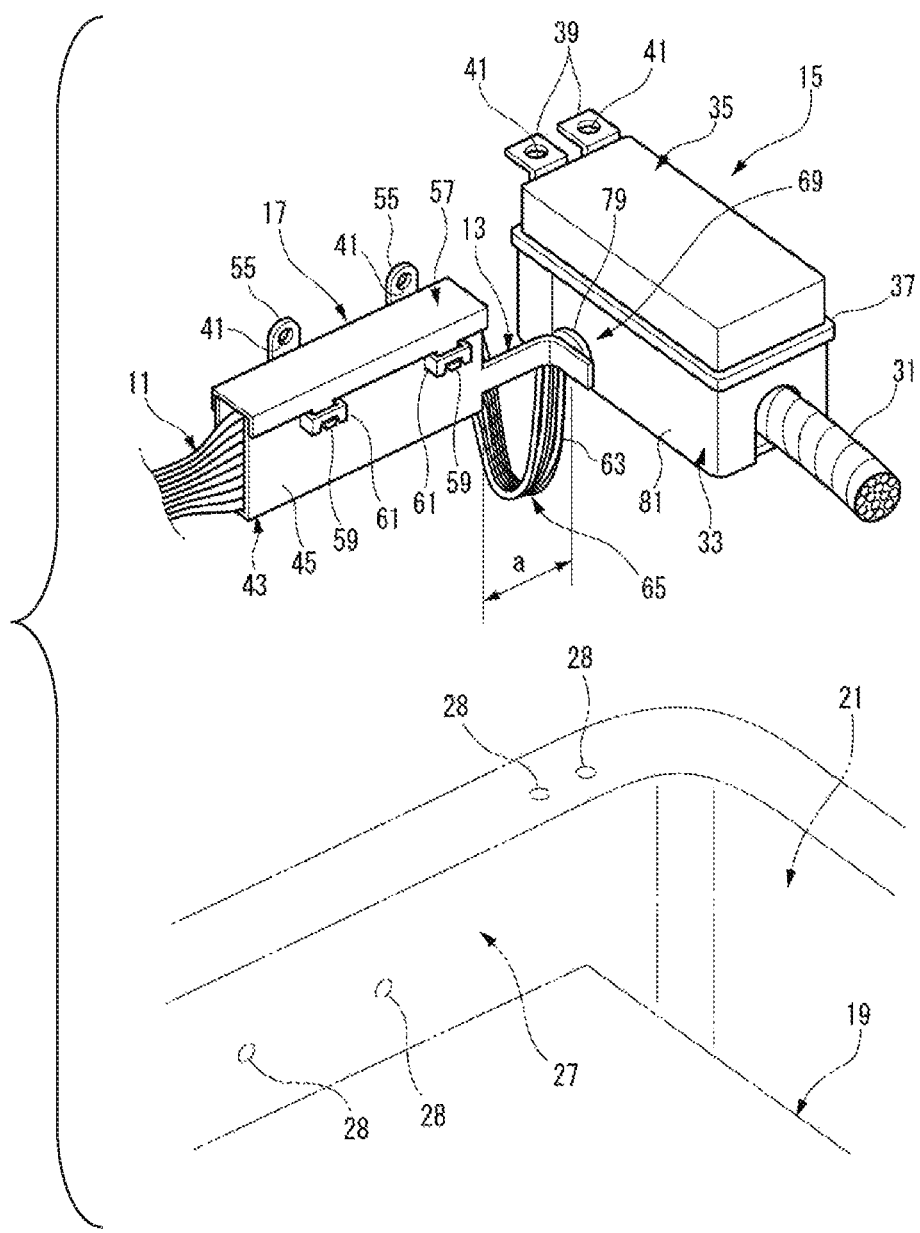
FIG. 1 is a perspective view illustrating a connection structure of an electrical junction box and a protection member according to a first embodiment of the present invention.

FIG. 1 is a perspective view illustrating a connection structure of an electrical junction box and a protection member according to a first embodiment of the present invention.

The connection structure of an electrical junction box and a protection member according to the first embodiment includes a relay box 15 which is an electrical junction box, a wire harness 11, a protector 17 which is a protection member, and a connection band 13 as main constituent members.

The electrical junction box according to the present invention is not limited to the relay box 15 in the present embodiment. The electrical junction box may be another box (casing) such as a fuse box or a junction box that accommodates electric parts and leads out the wire harness 11. Further, the protection member in the present embodiment is a protector 17 formed into a rectangular cylindrical shape by insulating resin. The protection member according to the present invention may also be a corrugate tube or the like.

Figure 2:
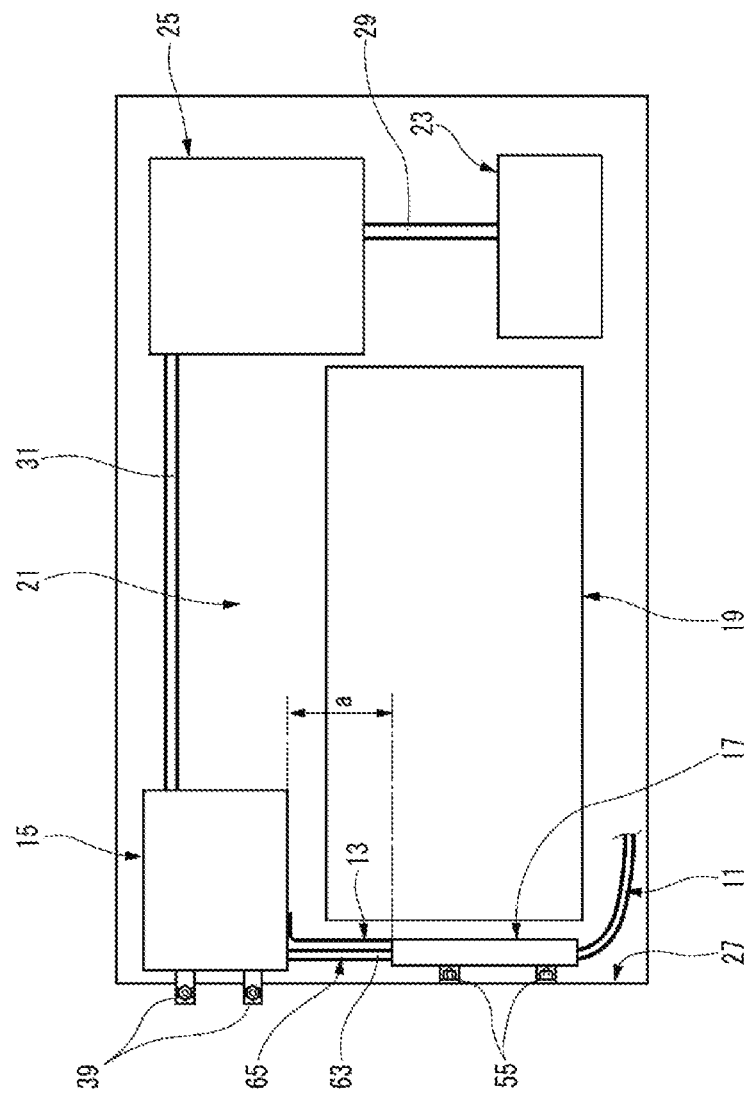
FIG. 2 is a schematic diagram illustrating an arrangement example of an engine and electrical components in an engine room.

FIG. 2 is a schematic diagram illustrating an arrangement example of an engine 19 and electrical components in an engine room.

The connection structure of an electrical junction box and a protection member according to the present embodiment can be suitably used, for example, in the engine room 21. Most of the engine room 21 is used for accommodating the engine 19. In the engine room 21, a battery 23, a junction box 25, a relay box 15, and the like are attached to a body panel 27 which is a vehicle body, in an accommodating space secured around the engine 19.

The battery 23 and the junction box 25 are connected by a trunk wire harness 29. The junction box 25 and the relay box 15 are connected by a branch wire harness 31. The other end of the wire harness 11 on the load side connected to the respective electrical components is led out from the outlet portion opened to the bottom wall of the relay box 15.

The relay box 15 includes a box body 33 having a substantially rectangular parallelepiped shape to which a fuse, a relay and the like (not shown) are attached, and a waterproof cover 35 to be fitted in the upper opening of the box body 33. The waterproof cover 35 is removable on the box body 33 so as to protect the accommodated parts from water droplets, dust and the like and to inspect and exchange the accommodated parts. When the waterproof cover 35 is fitted in the upper opening of the box body 33, the skirt portion 37 of the waterproof cover 35 covers the outer periphery of the peripheral wall opening edge of the box body 33, it is possible to suppresses the infiltration of water droplets or the like from the outside into the box body 33 and the inner space of the cover 35. Although not shown, a lower cover for leading out the wire harness 11 outwardly may be detachably attached to the lower portion of the box body 33.

A functional component mounting portion (not shown) to which fuses, relays, and the like are mounted is accommodated in the box body 33. A circuit connected to a fuse, a relay, or the like is formed in the functional component mounting portion by a bus bar or the like. In the wire harness 11 connected to the relay box 15, a terminal (not shown) provided at one end is connected by a connector to a mating terminal connected to the bus bar.

On one side portion of the box body 33, a plurality (two in the present embodiment) of box fixing pieces 39 are formed so as to protrude horizontally. The box fixing piece 39 has a bolt through hole 41. The relay box 15 is bolt-fastened by the box fixing pieces 39 provided in the box body 33, and fixed to the fixing hole 28 of the body panel 27.

In the wire harness 11, a terminal provided at one end is connected to the mating terminal of the functional component mounting portion inside the relay box 15, and the other end is led out from the relay box 15. The wire harness is formed as a wire bundle in which electric wires connected to a plurality of electrical components are tape-wound. That is, one end of the wire harness 11 is fixed in the relay box, and the protector 17 is attached to the other end of the wire harness 11 led out from the relay box 15.

Figure 3:
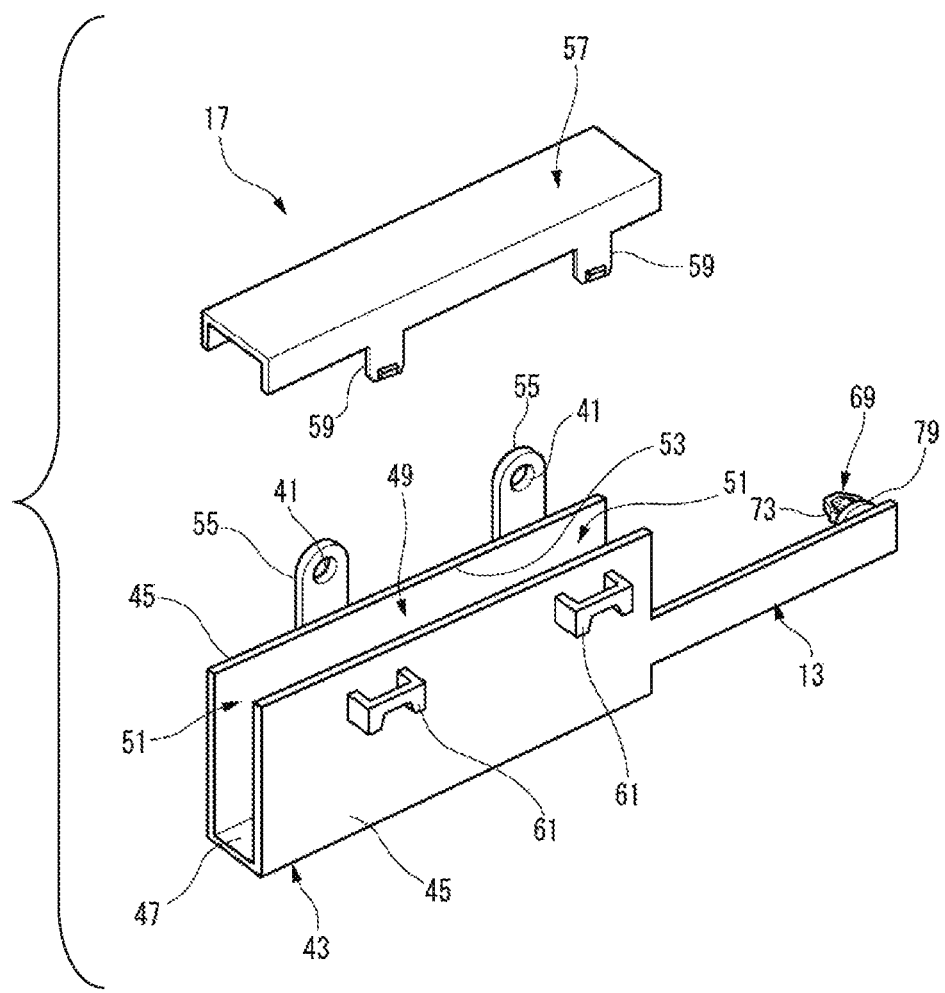
FIG. 3 is an exploded perspective view of the protection member illustrated in FIG. 1.

FIG. 3 is an exploded perspective view of the protector 17 illustrated in FIG. 1.

As illustrated in FIG. 3, the protector 17 as a protection member has a protector body 43 and a protector cover 57. In the protector body 43, a pair of parallel side-plate portions 45 are connected by a bottom plate portion 47, and a cross section orthogonal to the longitudinal direction of the wire harness 11 is formed into a substantially U shape. Between the pair of side-plate portions 45, a wire harness accommodating space 49 is formed. In the protector body 43, both ends of the wire harness 11 in the extending direction are the insertion opening 51. In addition, in the protector body 43, the upper portion of the pair of side-plate portions 45 is the accommodation space opening portion 53 of the wire harness accommodating space 49. In one side-plate portion 45, protector fixing pieces 55, which are a plurality of attaching portions for fixing the protector 17 to the body panel 27, are formed to protrude upward. The protector fixing piece 55 has a bolt through hole 41. The protector body 43 is bolt-fastened by the protector fixing piece 55 and fixed to a fixing hole 28 of the body panel 27.

A protector cover 57 is fitted in the accommodation space opening 53 of the protector body 43. A pair of body locking pieces 59 are provided vertically on both side edge portions of the protector cover 57 toward the protector body 43, respectively. Further, a cover locking portion 61 is formed to lock the body locking piece 59 on both side-plate portions 45 of the protector body 43, respectively. The protector cover 57 covers the accommodation space opening 53 of the wire harness accommodating space 49 accommodating the wire harness 11, by the body locking piece 59 being locked in the cover locking portion 61 of the side-plate portion 45. Thus, the protector 17 covers the other end of the wire harness 11 led out from the relay box 15, the other end being inserted into the protector 17, and is fixed to the body panel 27.

The connection band 13 is attached across the protector 17 and the relay box 15. In the first embodiment, one end of the connection band 13 is integrally connected to the other side-plate portion 45 of the protector body 43. That is, the connection band 13 is integrally formed with the protector body 43.

Figure 4:
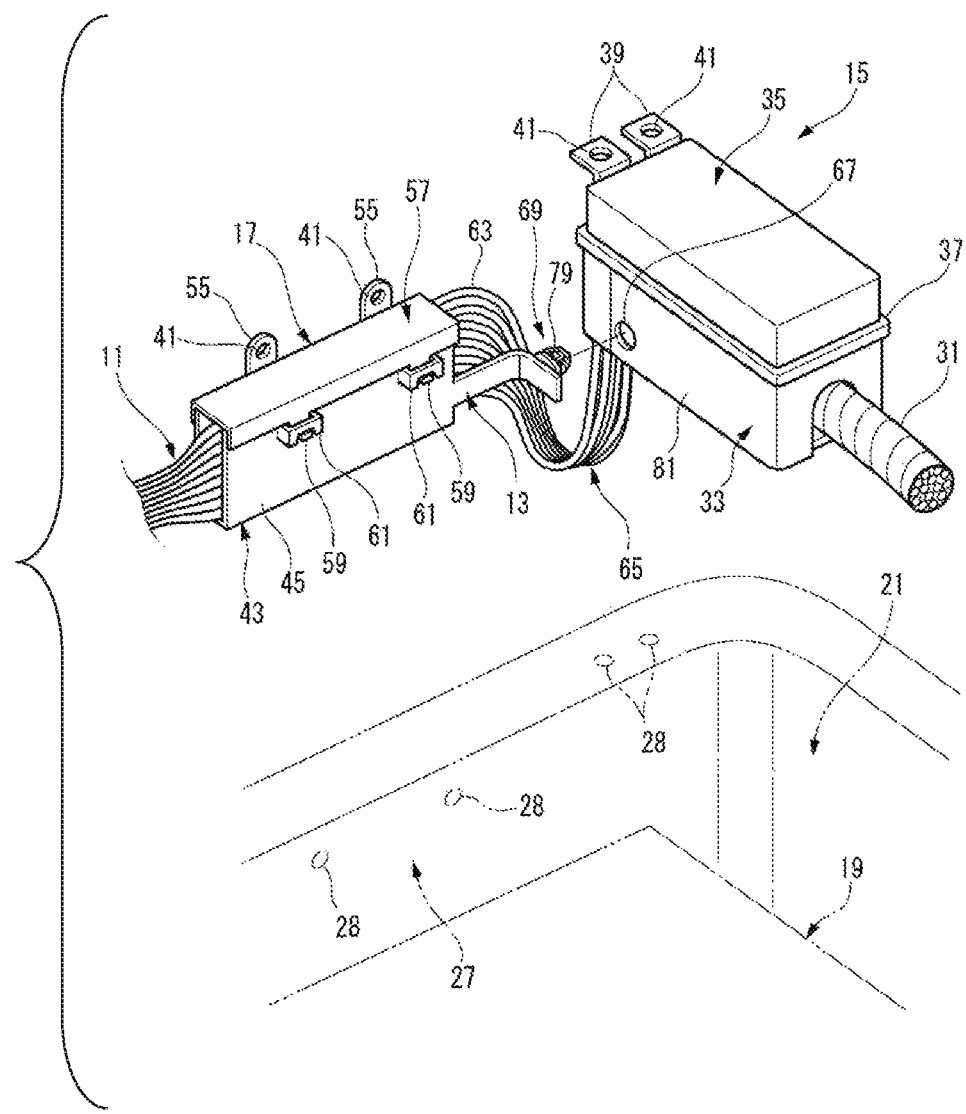
FIG. 4 is an exploded perspective view of the protection member and the electrical junction box before being connected by a connection band.

FIG. 4 is an exploded perspective view of the protector 17 and the relay box 15 before being connected by the connection band 13.

The connection band 13 is formed into a band plate shape by an electrically insulating resin integral with the protector body 43 and has flexibility. Therefore, as illustrated in FIG. 4, when the connection band 13 is attached across the relay box 15 and the protector 17 disposed along the intersecting wall surface of the body panel 27 at the corner of the engine room 21, the connection band 13 can also be bent in a direction perpendicular to the plate surface. The connection band of the present invention can also be formed into a flat plate shape having high rigidity and hard to be deflected.

The connection band 13 holds the protector 17 and the relay box 15 apart from each other by a predetermined distance a (see FIGS. 1 and 2). The wire harness 11 has an extra length portion 63 exposed between the protector 17 and the relay box 15. The predetermined distance a is set to a distance where the extra length portion 63 is bent downward in the vertical direction to form the draining portion 65. Therefore, the predetermined distance a is shorter than the linear distance of the extra length portion 63 ("predetermined distance a"<"linear distance of the extra length portion 63").

Since the connection band 13 according to the present embodiment is formed integrally with the protector body 43, the connection band 13 has the locking portion 69 only at the extending end opposite to the protector body 43.

Figure 5:
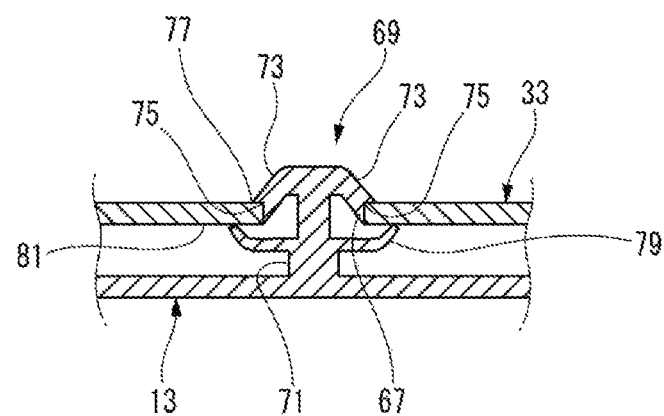
FIG. 5 is a cross-sectional view of a main parts of the electrical junction box and the connection band in which a locking portion is locked in a locking hole.

FIG. 5 is a cross-sectional view of main portions of the relay box 15 and the connection band 13 in which the locking portion 69 is locked in the locking hole 67 of the box body 33.

As illustrated in FIG. 5, the locking portion 69 has a shaft portion 71 projecting vertically from one surface of the connection band 13. At the tip of the shaft portion 71, there are a pair of locking wing pieces 73 which spread out toward the opposite side in the protruding direction of the shaft portion. The locking wing piece 73 has a locking stepped portion 75 to be locked in the edge of the locking hole 67 at the spreading tip. A pair of locking wing pieces 73 are inserted into the locking holes 67 of the box body 33 from the tip side of the shaft portion 71, so the diameter is reduced by elastic deformation. When the locking wing piece 73 having passed through the locking hole 67 elastically returns, the locking stepped portion 75 is locked in the back side edge 77 on the side opposite to the insertion direction of the locking hole 67.

In the shaft portion 71, a disk-shaped water stopping plate portion 79 is formed on the rear side in the insertion direction of the locking wing piece 73. The pair of locking wing pieces 73 are locked in the back side edge 77 of the locking hole 67, and the water stopping plate portion 79 abuts against the peripheral edge on the insertion side of the locking hole 67 in the side wall 81. Thus, the locking portion 69 is fixed to the locking hole 67 of the box body 33, by the side wall 81 of the box body 33 being sandwiched between the locking wing piece 73 and the water stopping plate portion 79 from the front and the back.

When the locking portion 69 is fixed to the locking hole 67 bored in the side wall 81 of the relay box 15, the water stopping plate portion 79 comes into contact with the peripheral edge on the insertion side of the locking hole 67. That is, the water stopping plate portion 79 can close the opening of the locking hole 67, when the locking portion 69 is locked in the locking hole 67. Thus, infiltration of water, dust, or the like which try to enter the relay box 15 from the outside is suppressed in the locking hole 67.

Next, the operation of the above configuration will be described.

In the connection structure of an electrical junction box and a protection member according to the present embodiment, one end of the wire harness 11 is connected in advance to the relay box 15 attached to the body panel 27. The wire harness 11 is electrically connected to the relay box, by the terminal provided at one end of the wire harness 11 being coupled to the mating terminal in the relay box. The other end of the wire harness 11, of which one end is electrically connected, is led out from the relay box 15. The wire harness 11 led out from the outlet portion of the relay box 15 is covered and protected by being inserted into the protector 17.

An extra length portion 63 of the wire harness 11 exposed from the protector 17 is provided between the protector 17 and the relay box 15. The other end of the wire harness 11 led out from the relay box 15 fixed to the body panel 27 in the engine room 21 is fixed to the body panel 27 after the protector 17 is connected to the relay box 15 by the connection band 13.

In the wire harness 11, the extra length portion 63 exposed between the protector 17 and the relay box 15 is shortened to a predetermined distance a, by fixing the protector 17 to the relay box 15 by the connection band 13. As a result, the extra length portion 63 is formed as a draining portion 65 bent at a predetermined curvature (U shape) downward in the vertical direction. The draining portion 65 suppresses the infiltration of water into the outlet portion of the relay box 15 by making water adhering to the wire harness 11 flow down to the lowermost end of the bent portion.

Since the connection structure of an electrical junction box and a protection member according to the first embodiment is provided with the connection band 13, the protector 17 can be fixed in the engine room 21, without performing a complicated positioning operation of moving the protector 17 to the proper position after fixing the relay box 15 in the engine room 21. Therefore, it is easy to wire the wire harness 11 into the engine room 21.

In addition thereto, in the connection structure of an electrical junction box and a protection member include the connection band according to the first embodiment, the draining portion 65 obtained by bending the extra length portion 63 can absorb the stress (tension) applied to the wire harness 11. Therefore, in the wire harness 11, no tensile force (disconnection hardly occurs) is applied to each terminal neck in the relay box 15, and electrical reliability is improved. In addition, even when the protector 17 and the relay box 15 are connected to each other by the connection band 13, no tensile force (disconnection hardly occurs) is applied to each terminal neck in the relay box 15, so the wire harness 11 has improved electrical reliability.

As described above, in the connection structure of an electrical junction box and a protection member according to the first embodiment, the dimensioning between the relay box 15 and the protector 17 and the countermeasure against water infiltration are made possible by easy wiring work of the wire harness 11 into the engine room 21.

In the connection structure of an electrical junction box and a protection member according to the first embodiment, the locking portion 69 of the connection band 13 is locked in the locking holes 67 of the relay box 15, so the protector 17 is connected to the relay box 15 through the connection band 13. The locking portion 69 has a water stopping plate portion 79 and is locked in the locking hole 67 of the box body 33, and the water stopping plate portion 79 abuts against the peripheral edge of the locking hole 67 in the side wall 81 to close the opening from the outside of the relay box 15. Thus, it is possible to take countermeasures against water infiltration into the locking hole 67 bored in the relay box 15 in order to fix the connection band 13.

Since the locking hole 67 is bored, the relay box 15 can be easily molded compared to the case where the locking portion 69 is projected. Naturally, the relay box 15 may protrude the locking portion 69. In this case, in the connection band 13, a locking hole 67 to be locked in the locking portion 69 is formed at the fixed end.

Second Embodiment

Next, a connection structure of an electrical junction box and a protection member according to a second embodiment of the present invention will be described.

Figure 6:
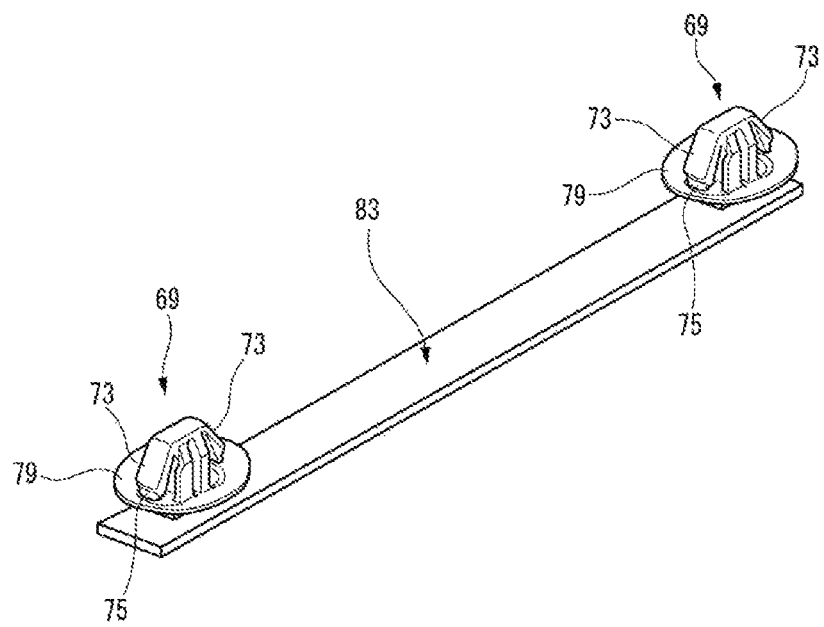
FIG. 6 is a perspective view of a connection band used for a connection structure of an electrical junction box and a protection member according to a second embodiment of the present invention.
Figure 7:
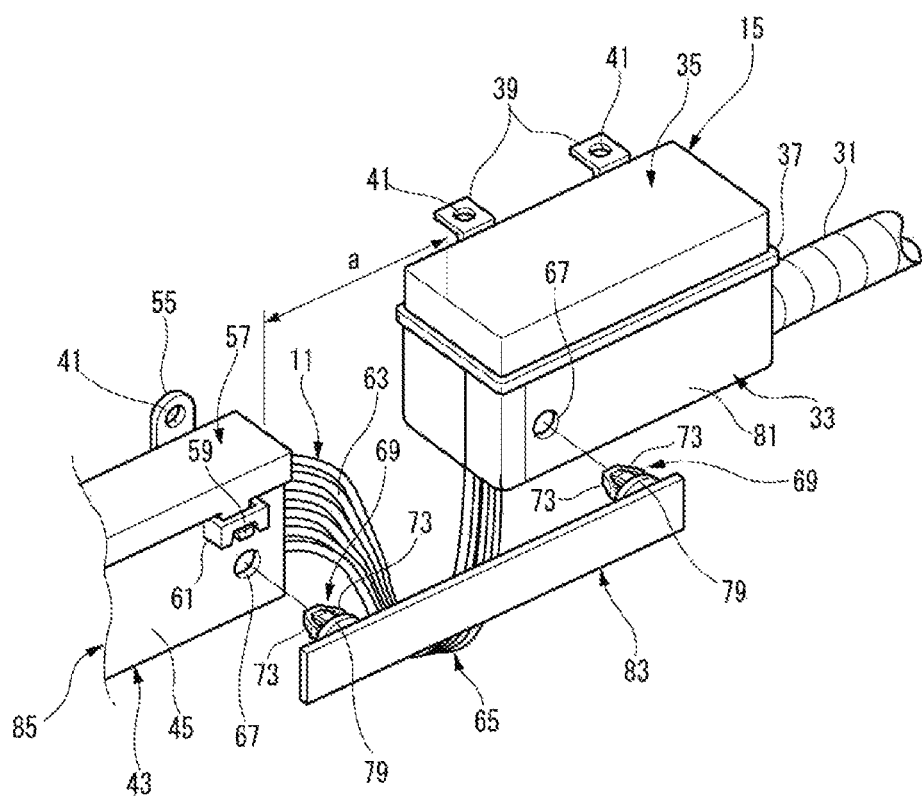
FIG. 7 is an exploded perspective view illustrating the connection structure of an electrical junction box and a protection member according to the second embodiment of the present invention.

FIG. 6 is a perspective view of a connection band 83 used for the connection structure of an electrical junction box and a protection member according to a second embodiment of the present invention, and FIG. 7 is an exploded perspective view illustrating the connection structure of an electrical junction box and a protection member according to the second embodiment of the present invention. In the second embodiment, the same components as those described in the first embodiment are denoted by the same reference numerals, and redundant description is omitted.

In the connection structure of an electrical junction box and a protection member according to the second embodiment, the connection band 83 is formed separately from the relay box 15 and the protector 85. Locking portions 69 are integrally formed at both longitudinal ends of the connection band 83, respectively. The connection band 83 is integrally molded in a band plate shape by the same electrically insulating resin as the above and has flexibility. Naturally, the connection band 83 can also be formed into a flat plate shape having high rigidity and hard to be deflected.

The relay box 15 is provided with a locking hole 67 similar to that described above. That is, the relay box 15 is the same as in the first embodiment. On the other hand, in the protector 85, a locking hole 67 is provided in the side-plate portion 45. Since the locking portions 69 at both ends of the connection band 83 are locked to the locking hole 67 of the relay box 15 and the locking hole 67 of the protector 85, respectively, the relay box 15 and the protector 85 are disposed in series along the wall surface of the body panel 27 with a predetermined distance a. Other configurations are the same as those of the first embodiment.

In the connection structure of an electrical junction box and a protection member according to the second embodiment, the connection band 83 is fixed to either the relay box 15 or the protector 85. Next, the relay box 15 is fixed to the body panel 27. Then, the unlocked locking portion 69 of the connection band 83 is fixed to the other locking hole 67 of the relay box 15 or the protector 85, and the protector 85 is positioned at a predetermined distance a from the relay box 15. In this state, the protector 85 is fixed to the body panel 27. Since the relay box 15 and the protector 85 are fixed to each other with the predetermined distance a, as in the first embodiment, the draining portion 65 bending the extra length portion 63 is formed between the relay box 15 and the protector 85.

In the connection structure of an electrical junction box and a protection member according to the second embodiment, the connection band 83 is formed separately from the protector 85 and the relay box 15. The connection band 83 is formed into an elongated band shape such that the protector 85 and the relay box 15 can be separated from each other by a predetermined distance a while avoiding interference with other members. A locking portion 69 is formed at both longitudinal ends of the connection band 83. On the other hand, each of the protector 85 and the relay box 15 is provided with a locking hole 67 to which the locking portion 69 is locked. The locking portion 69 of the connection band 83 is locked in the locking holes 67 of both the protector 85 and the relay box 15, so the protector 85 is separated from the relay box 15 by a predetermined distance a through the connection band 83.

In the connection structure of an electrical junction box and a protection member according to the second embodiment, the separation distance between the protector 85 and the relay box 15 is determined by the connection band 83. Therefore, in the connection structure of an electrical junction box and a protection member according to the second embodiment, a plurality of connection bands 83 having different lengths can be formed and aligned. According to the connection structure of an electrical junction box and a protection member of the second embodiment, a predetermined connection band 83 is selectively used according to the separation distance between the protector 85 and the relay box 15, which differs according to the specification of the vehicle, so it is possible to easily deal with various specifications.

As described above, in the connection structure of an electrical junction box and a protection member according to each of the embodiments, it is possible to improve the water stopping performance and to facilitate the wiring work of the wire harness 11 into the engine room 21.

The present invention is not limited to the above-described embodiments, combinations of respective configurations of the embodiments, and changes and applications by a person skilled in the art based on the description in the specification and well-known techniques are also included in the scope for which protection is sought.

Here, the features of the embodiment of the connection structure of an electrical junction box and a protection member according to the present invention described above are briefly summarized below in the following [1] to [3], respectively.

[1] A connection structure of an electrical junction box and a protection member comprising:

an electrical junction box (relay box 15) configured to be attached to a vehicle body (body panel 27);

a wire harness (11) in which one end is connected into the electrical junction box and other end is led out from the electrical junction box;

a protection member (protector 17) in which the other end of the wire harness led out from the electrical junction box is covered and inserted and which includes an attaching portion (protector fixing piece 55) fixed to the vehicle body; and a connection band (13 or 83), wherein the connection band (13 or 83) connects the protection member to the electrical junction box, and holds the protection member and the electrical junction box with a predetermined distance (a) therebetween such that an extra length portion (63) of the wire harness which is exposed between the protection member and the electrical junction box is bent downward in a vertical direction to form a draining portion (65).

[2] The connection structure of the electrical junction box and the protection member according to [1], wherein at least one of the electrical junction box and the protection member includes a locking hole (67), wherein the connection band (13) includes a locking portion (69) which is locked in the locking hole (67), and wherein the locking portion includes a water stopping plate portion (79) which abuts against a peripheral edge of the locking hole to close an opening of the locking hole, when the locking portion is locked in the locking hole.

[3] The connection structure of an electrical junction box and a protection member according to [1] or [2], wherein each of the electrical junction box and the protection member includes a locking hole (67), wherein the connection band includes a plurality of locking portions (69) at both ends of the connection band, each of which is locked in the locking hole, and wherein the connection band (83) is formed separately from the electrical junction box and the protection member.

[4] The connection structure of an electrical junction box and a protection member according to any one of [1] to [3], wherein the protection member (17) includes a main body portion (43) and a cover portion (57), and wherein the cover portion (57) is fitted in a accommodation space opening (53) of the main body portion (43).

[5] The connection structure of an electrical junction box and a protection member according to [4], wherein a pair of main body locking pieces (59) are formed on both side edge portions of the cover portion (57) in the vertical direction toward the main body portion (43), respectively, and wherein a pair of a cover locking portions (61) are formed on a side-plate portion (45) of the main body portion (43) to lock the pair of the main body locking pieces (59) respectively.

DESCRIPTION OF REFERENCE NUMERALS AND SIGNS

11 WIRE HARNESS
13 CONNECTION BAND
15 RELAY BOX (ELECTRICAL JUNCTION BOX)
17 PROTECTOR (PROTECTION MEMBER)
27 BODY PANEL (VEHICLE BODY)
55 FIXING PIECE (ATTACHING PORTION)
63 EXTRA LENGTH PORTION
65 DRAINING PORTION
67 LOCKING HOLE
69 LOCKING PORTION
79 WATER STOPPING PLATE PORTION

What is claimed is:

1. A connection structure of an electrical junction box and a protection member comprising:

an electrical junction box configured to be attached to a vehicle body;

a wire harness in which one end is connected into the electrical junction box and other end is led out from the electrical junction box;

a protection member in which the other end of the wire harness led out from the electrical junction box is covered and inserted and which includes an attaching portion configured to be fixed to the vehicle body; and a connection band, wherein the connection band connects the protection member to the electrical junction box, and holds the protection member and the electrical junction box with a predetermined distance therebetween such that an extra length portion of the wire harness which is exposed between the protection member and the electrical junction box is bent downward in a vertical direction to form a draining portion.

2. The connection structure of the electrical junction box and the protection member according to claim 1, wherein at least one of the electrical junction box and the protection member includes a locking hole, wherein the connection band includes a locking portion which is locked in the locking hole, and wherein the locking portion includes a water stopping plate portion which abuts against a peripheral edge of the locking hole to close an opening of the locking hole, when the locking portion is locked in the locking hole.

3. The connection structure of an electrical junction box and a protection member according to claim 1, wherein each of the electrical junction box and the protection member includes a locking hole, wherein the connection band includes a plurality of locking portions at both ends of the connection band, each of which is locked in the locking hole, and wherein the connection band is formed separately from the electrical junction box and the protection member.

4. The connection structure of an electrical junction box and a protection member according to claim 1, wherein the protection member includes a main body portion and a cover portion, and wherein the cover portion is fitted in an accommodation space opening of the main body portion.

5. The connection structure of an electrical junction box and a protection member according to claim 4, wherein a pair of main body locking pieces are formed on both side edge portions of the cover portion in the vertical direction toward the main body portion, respectively, and wherein a pair of a cover locking portions are formed on a side-plate portion of the main body portion to lock the pair of the main body locking pieces respectively.

* * * * *